Patented May 9, 1939

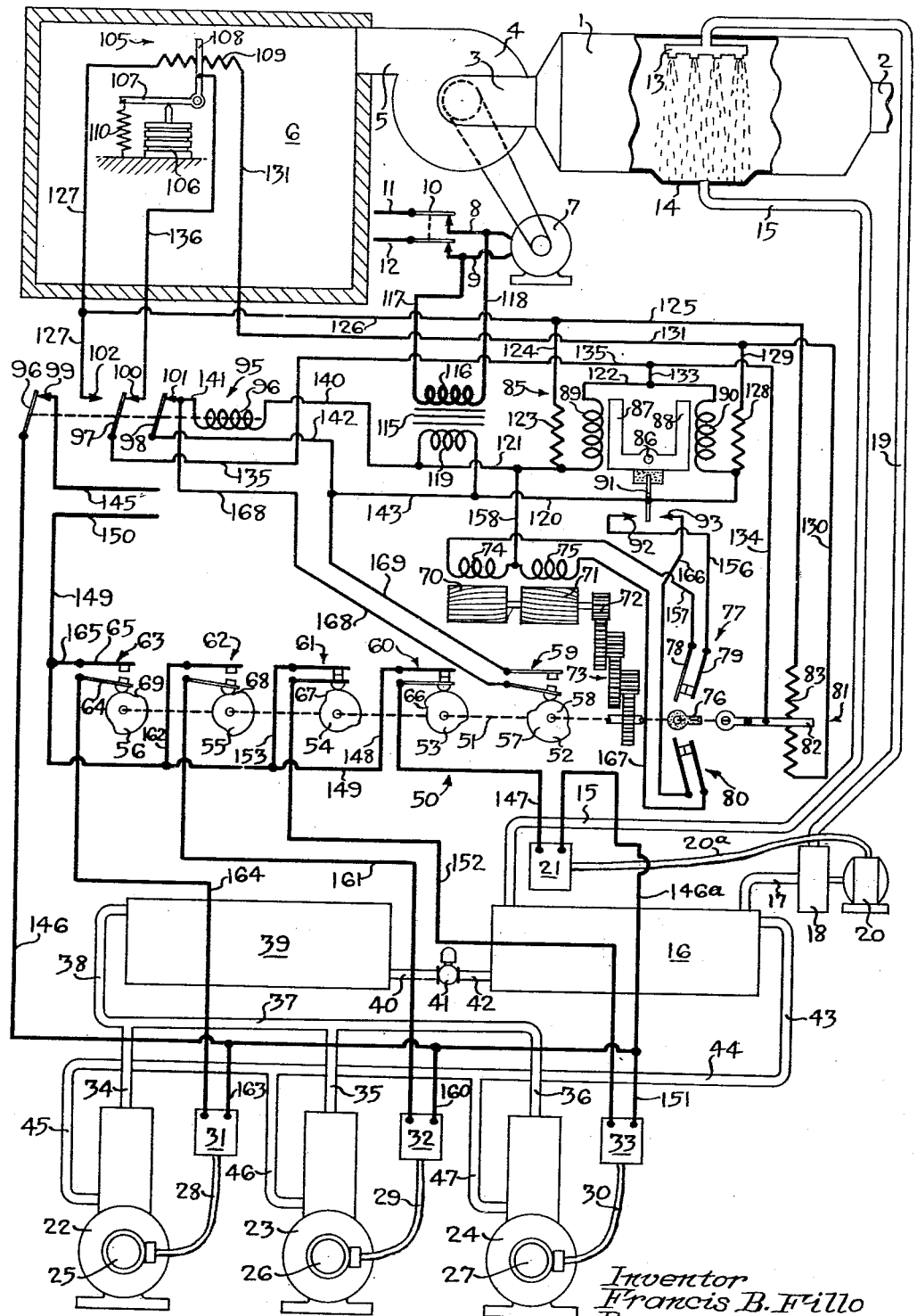

2,157,329

UNITED STATES PATENT OFFICE 2,157,329

CONTROL SYSTEM

Francis B. Fillo, Webster Groves, Mo., assignor to Minneapolis-Honeywell Regulator Company, Minneapolis, Minn., a corporation of Delaware Application February 12, 1937, Serial No. 125,419

18 Claims. (Cl. 62—4)

This invention relates in general to controllers and is more particularly concerned with the control of power consuming devices such as employed, for instance, in air conditioning systems.

In the art of air conditioning it is common to cause cooling and dehumidification of air by passing it through a spray of chilled water. The chilling of this water is in many cases accomplished by means of a compression refrigeration system. Due to the fact that the cooling load of an air conditioning system varies considerably with changes in weather conditions and occupancy, it is desirable to employ a type of refrigeration system therefor which has sufficient flexibility of operation to remain reasonably efficient for all loads. For this purpose such refrigeration systems are provided with a number of compressors, and these compressors are sequentially placed in operation as the refrigeration load increases and are sequentially placed out of operation as the load decreases. Automatic control devices have also been employed for effecting this sequential control of the compressors. Heretofore, however, such control devices have been subject to the serious disadvantages of having no provision for sequentially starting the compressors in the event of a power failure. Thus should the refrigeration load be heavy and all of the compressors be placed in operation by the sequential controller when a power failure should occur, upon restoration of the power all of the compressors would simultaneously start, this causing an extremely large current to be thrown on the line, and resulting in opening of the circuit breakers.

One object of my invention is, therefore, to provide an air conditioning control system of the type which automatically increases the number of compressors placed in operation upon an increase in load, such system acting upon a failure of power to cause the compressors to be restarted sequentially.

A further object of my invention is the provision of an automatic controller of the proportioning type with a means for causing such controller to move to an extreme position upon the occurrence of a predetermined abnormal condition, such movement to extreme position conditioning the controller to return to a position determined by its control device.

Another object of my invention is the provision of a sequential controller for a plurality of control devices, such controller acting to sequentially actuate said control device in accordance with the controlled condition and acting also to actuate said devices in a predetermined manner upon the occurrence of a predetermined second condition.

A still further object of my invention is to provide a control means for a plurality of power consuming devices, such means acting upon a power failure to disconnect said devices from their source of power and to sequentially place said devices into operation upon a resumption of power.

Another object is the provision of a proportioning motor type of controlling means for controlling a medium in accordance with the desired condition, such control means being provided with a device for causing the proportioning motor to assume an extreme position upon the occurrence of a predetermined condition of the medium being controlled.

Other objects will appear from the following description and the appended claims.

For a full disclosure of my invention reference is made to the following detailed description taken in connection with the accompanying drawing, the single figure of which diagrammatically represents one form which my invention may take.

Referring to the drawing, the reference character 1 indicates an air conditioning chamber, this chamber being provided with an inlet or return duct 2 and a discharge duct 3, this duct being connected to the inlet of a fan 4, the discharge 5 of which communicates with the space to be conditioned 6. The fan 4 is provided with a suitable electric motor 7, this motor being connected by the wires 8 and 9 to the line switch 10 which in turn is connected to suitable line wires 11 and 12.

Located in the conditioning chamber 1 is a spray pipe 13 which is provided with a plurality of jets through which water is forced to provide a spray through which the air is passed. Located beneath the spray pipe 13 is a suitable trough 14 which collects the water issuing from said spray pipe. Connected to the trough 14 is a drain pipe 15, this drain pipe leading into a cooler 16 which forms the evaporator of a compression refrigeration system. Connected to the cooler 16 is an outle pipe 17, this pipe leading to the suction side of a centrifugal pump 18 the discharge of which is connected by a pipe 19 to the spray pipe 13. The pump 18 is driven by an electric motor 20, this electric motor being connected by a suitable electrical conduit 20a with the starting box 21. From the foregoing it should be seen that when the motor 20 is placed into operation by the starting box 21 refrigerated water will be drawn from the cooler 16 and discharged into the pipe 19, thus passing to the spray pipe 13 wherein it is sprayed over the air passing through the conditioning chamber, such water then being collected by the trough 14 and passed through the pipe 15 back to the cooler 16.

As mentioned previously, the water cooler 16 forms the evaporator of a compression refrigeration system. This system comprises compressors 22, 23 and 24, these compressors being driven respectively by electric motors 25, 26 and 27. The motors 25, 26 and 27 are connected by conduits 28, 29 and 30 with individual starters 31, 32 and 33 respectively. The discharge sides of the compressors 22, 23 and 24 are connected by branch conduits 34, 35 and 36 to the discharge header 37, this discharge header being connected by a pipe 38 to the inlet of a condenser 39. The outlet of the condenser 39 is connected by a pipe 40 to an expansion valve 41 and this expansion valve is connected by pipe 42 to the inlet of the evaporator 16. The outlet of the evaporator 16 is connected by pipe 43 to a suction header 44, this header being connected by branch pipes 45, 46 and 47 to the suction sides of the compressors 22, 23 and 24 respectively.

The compression refrigeration system just described is filled with a suitable refrigerant and operates in the usual manner. The compressors when in operation act to raise the pressure of the refrigerant and to discharge this refrigerant at high pressure and in a gaseous state into the condenser 39 wherein heat is removed from such refrigerant causing it to assume the liquid state. This liquefied refrigerant is then passed through the pipe 40 to the expansion valve 41 wherein its pressure is greatly reduced. Due to this reduction in pressure, evaporation of the refrigerant from the liquid to the gaseous state takes place, this causing an absorption of heat from the water flowing through said evaporator. This gasified refrigerant is then withdrawn from the evaporator or cooler 16 by the action of the compressors and again raised in pressure, this cycle being repeated continuously. It will be apparent that with one compressor in operation a certain amount of refrigeration will take place and that as the number of compressors in operation is increased the refrigerating action of the system will be correspondingly increased.

In order to control the pump 18 and the compressors 22, 23 and 24, a sequential control device generally indicated at 50 is provided. This sequential controller comprises a shaft 51 upon which are mounted cams 52, 53, 54, 55 and 56. These cams are each provided with raised portions 57 and with recessed portions 58 to adapt them for controlling the switches 59, 60, 61, 62 and 63. Each of these switches 59 to 63 comprise a cam follower blade 64 which blade carries a contact adapted for engagement with a similar contact carried by a stationary contact blade 65. These switches are so designed that when the cam follower blade thereof engages the recessed portion of its associated cam, the contacts will be separated. When, however, the associated cam is rotated so that the raised portion thereof engages the cam follower blade such blade will be moved upwardly causing its contact to be brought into engagement with that carried by the stationary blade. The cams 53, 54, 55 and 56 are arranged so as to cause sequential closing of the switches 60 to 63 as the shaft 51 is rotated in a counter-clockwise direction. Thus it will be seen that the shoulder 66 of the cam 53 which separates the raised portion of said cam from the recessed portion thereof is angularly displaced in a counter-clockwise direction from the corresponding shoulder 67 of the cam 54. Similarly the shoulder 67 of cam 54 is displaced counter-clockwise of the shoulder 68 of the cam 55, and this shoulder is angularly displaced from the shoulder 69 of the cam 56. By this arrangement, when the shaft 51 is rotated in a clockwise direction sufficiently to cause the recessed portion of the cam 53 to engage the switch 60, said switch will open, and at this time the recessed portions of the cams 54, 55 and 56 will be engaging their corresponding switches and therefore the switches 60, 61, 62 and 63 will all be open. Now as the shaft 51 is rotated in a counter-clockwise direction the raised portion of the cam 53 will first engage the switch 60 causing closing of this switch. Upon further rotation of shaft 51 in the same direction the raised portion of cam 54 will engage switch 61 causing this switch to close. Similarly, upon further rotation of the shaft 51 the switches 62 and 63 will be closed sequentially. Upon rotation of shaft 51 in the opposite direction the opposite action will take place, this is, the switches 60 to 63 will be opened in reverse order.

The cam 52 is arranged on the shaft 51 differently from the other cams. This cam is arranged so that the recessed portion thereof engages the follower portion of the switch 59 so long as the shaft 51 is in an angular position, which causes closing by the cam 53 of the switch 60. Therefore, as the shaft 51 is rotated in a clockwise direction the switches 60, 61, 62 and 63 will be opened in reverse order and finally upon further clockwise rotation, the raised portion of the cam 52 will engage the switch 59 causing closing of said switch. The switch 59 therefore remains open so long as any of the switches 60 to 63 remain closed, and upon opening of the switches 60, 61, 62 and 63 the switch 59 will be closed.

In order to drive the shaft 51 the motor rotors 70 and 71 are provided, these being mounted upon a shaft to which is secured a pinion 72 which forms part of a speed reducing gear train 73 the last gear of which is mounted upon the shaft 51. Cooperating with the rotor 70 is a field coil 74, a similar field coil 75 cooperating with the rotor 71. The rotor 70 and its field coil 74 form a motor for driving the shaft 51 in one direction while the rotor 71 and its field coil 75 cooperate to form a motor for driving said shaft in the opposite direction. Therefore when the rotor 74 is energized the shaft 51 will be driven in one direction and when the field coil 75 is energized said shaft will be driven in the opposite direction.

Mounted also upon the proportioning motor shaft 51 is a cam 76, this cam being adapted to cooperate with the limit switch 77. This limit switch is formed of a movable contact blade 78 and a stationary contact blade 79, the blade 78 being spring pressed against the blade 79 to cause the contacts carried by said blades to be normally closed. When the shaft 51 is rotated to its extreme counter-clockwise limit of rotation the raised portion of the cam 76 will engage the movable blade 78 thereby causing it to be moved away from the stationary blade 79 to disengage the contacts. It should therefore be seen that when the motor shaft 51 is rotated to its extreme counter-clockwise limit of rotation the limit switch 77 will be opened. Also cooperating with the cam 76 is a limit switch 80, this switch being formed in the same manner as the switch 77 and being arranged so that it will be contacted by the raised portion of the cam 76 when the shaft 51 is rotated to its extreme clockwise limit of rotation.

The reference character 81 indicates a balancing potentiometer, this instrument comprising a balancing arm 82 which is mounted upon the shaft 51 and which is arranged to cooperate with a balancing resistance 83. By this arrangement as the proportioning motor shaft 51 is rotated the balancing arm 82 will be shifted across the balancing resistance 83. The purpose of this balancing potentiometer will appear as this description proceeds.

Reference character 85 indicates a relay for controlling the energization of the motor field coils 74 and 75. This relay comprises a U-shaped armature pivoted at 86 and having legs 87 and 88 which cooperate with relay coils 89 and 90 respectively. Attached to the armature by means of an insulating connection is a switch arm 91, this switch arm being adapted to cooperate with the contacts 92 and 93. Energization of the relay coil 89 will have the effect of tending to pull the leg 87 of the armature upwardly thereby tending to cause clockwise rotation of said armature about its pivot. Similarly, the effect of the relay coil 90 when energized will be to tend to cause the leg 88 to be pulled upwardly, this tending to cause counter-clockwise rotation of said armature. Therefore, when the relay coils 89 and 90 are equally energized the effect of one upon the armature will be balanced by the effect of the other and the armature will assume an intermediate position in which the switch arm 91 is disengaged from both the contacts 92 and 93. If, however, the relay coil 89 is energized more highly than the relay coil 90 the switch arm 91 will be brought into engagement with the contact 92. Similarly, if the relay coil 90 is more highly energized than the relay coil 89 the switch arm 91 will be brought into engagment with the contact 93.

Reference character 95 indicates generally a relay comprising switch arms 96, 97 and 98, these switch arms being secured by a suitable connecting member to a plunger (not shown), which is located within the coil 95a. Cooperating with the switch arms 96, 97 and 98 are "in" contacts 99, 100 and 101 respectively. Also cooperating with the switch arm 97 is an "out" contact 102. When the relay coil 95a is energized the plunger will be pulled towards the right this causing the switch arms 96, 97 and 98 to be moved to the right into engagement with the contacts 99, 100 and 101 respectively. When the relay coil 95a is deenergized, however, the switch arms 96, 97 and 98 will be caused to move towards the left under the action of gravity or springs (not shown) this causing said switch arms to disengage from the contacts 99, 100 and 101 and causing the switch arm 97 to engage the contact 102.

Located in the conditioned space 6 is a temperature controller 105, this controller comprising a bellows 106 which is filled with a suitable volatile fluid and which at its lower end is mounted to a suitable fixed support. At its upper end said bellows cooperates with the actuating arm 107 of a bell crank lever which has as its other arm a control arm 108. The control arm 108 is arranged to cooperate with a control resistance 109. Attached to the free end of the actuating arm 107 is a spring 110 which urges said actuating arm against the bellows 106. Upon an increase in temperature within the space 6 the volatile fluid within the bellows 106 will increase in pressure, this causing expansion of the bellows which acts to rotate the actuating arm upwardly, this causing the control arm 108 to travel across the control resistance in a direction from left to right. Upon a decrease in temperature the pressure of the volatile fluid within the bellows 106 will decrease, this causing contraction of the bellows under the action of the spring 110 which results in moving of the control arm 108 across the control resistance from right to left.

Reference character 115 indicates a step-down transformer the primary 116 of which is connected by wires 117 and 118 to the wires 8 and 9 respectively which lead from the line switch 10 to the fan motor 7. The right-hand end of the secondary 119 of the transformer 115 is connected to the lower end of the relay coil 90 by a wire 120 while the left end of said transformer secondary is connected by a wire 121 to the lower end of the relay coil 89. The upper ends of the relay coils 89 and 90 are connected together by a wire 122. In this manner the relay coils 89 and 90 are connected in series across the terminals of the transformer secondary 119. Connected to the lower end of relay coil 89 is a resistance 123, this resistance being connected by a wire 124 to the wire 125 which leads to the upper end of the balancing resistance 83 and by wires 126 and 127 to the left end of the control resistance 109 of the temperature controller 105. The lower end of the relay coil 90 is connected to a resistance 128, this resistance being connected to a wire 129 which in turn is connected to a wire 130 which leads to the lower end of the balancing resistance 83. The wire 129 is also connected to the wire 131 which leads to the right-hand end of the control resistance 109. From the foregoing it should be seen that the balancing resistance 83 and the control resistance 109 are connected in parallel with the series connected relay coils 89 and 90 across the secondary 119 of the transformer 115. The wire 122 which connects the upper ends of the relay coils 89 and 90 is connected to a wire 133, this wire in turn connecting to the wire 134 which leads to the balancing arm 82 of the balancing potentiometer 81. The wire 133 is also connected to the wire 135 which leads to the switch arm 97 of the relay 95. The "in" contact 100 of the relay 95 is connected by a wire 136 with the control arm 108 of the temperature controller 105. When the relay coil 95a is energized, therefore, the upper ends of the relay coils 89 and 90 are connected to the control arm 108 of the temperature controller 105 through the switch arm 97 and contact 100.

With the wiring arrangement just described the portion of the control resistance 109 between its left-hand end and the control arm 108 is connected in parallel with the relay coil 89 by wires 127, 126 and 124, resistance 123 and wires 122, 133, 135, switch arm 97, contact 100, wire 136, and control arm 108. In a similar manner the portion of the control resistance 109 between the control arm 108 and the right-hand end of said resistance is connected in parallel with the relay coil 90 by wires 131, 129, resistance 128, wires 122, 133 and 135, switch arm 97, contact 100, wire 136 and control arm 108. Also by the wiring arrangement described it will be found that the portion of the balancing resistance 83 between the control arm 82 and the upper end of said resistance is connected in parallel with the relay coil 89, while the other portion of said balancing resistance is connected in parallel with the relay coil 90.

*Operation*

With the parts in the position shown the temperature within the space 6 is at an intermediate value as indicated by the control arm 108 of the temperature controller 105 engaging the center of the control resistance 109. The relay 95 is also pulled in, this relay being held in by a holding circuit for the relay coil 95a which is as follows: transformer secondary 119, wire 140, relay coil 95a, wire 141, contact 101, switch arm 98, wire 142, and wire 143 to transformer secondary 119. The shaft 51 of the controller 50 for this position of the controller 105 has assumed an intermediate angular position as indicated by the balancing arm 82 of the balancing potentiometer engaging the center of the balancing resistance 83. For this angular position of shaft 51 the switches 60 and 61 are closed while the switches 62 and 63 remain open. Also the switch 59 at this time is open as indicated. The closure of the switch 60 causes operation of the pump motor 20 by energizing the pump motor starter 21 through a circuit as follows: Line wire 145, contact 99, switch arm 96, wire 146, wire 146a, magnetic starter 21, wire 147, switch 60, wire 148, and wire 149 to line wire 150. Closure of switch 61 causes operation of the compressor 24 by energizing the magnetic starter 33 therefor through a circuit as follows: line wire 145, contact 99, switch arm 96, wire 146, wire 151, compressor motor starter 33, wire 152, switch 61, wire 153 and wire 149 to line wire 150. For an intermediate value of temperature in the space 6, therefore, the circulating pump 18 and the compressor 27 are placed in operation by the temperature controller 105.

If now should the temperature within the space 6 increase, the bellows 106 will expand, this causing travel of the control arm 108 across the control resistance 109 from left to right. This will have the effect of decreasing the portion of the control resistance 109 which is in parallel with the relay coil 90 and increasing the portion of said control resistance which is in parallel with the relay coil 89. This will result in increasing the current flow through the relay coil 89 and decreasing the current flow through the relay coil 90, this causing the leg 87 of the relay armature to be pulled upwardly, bringing the switch arm 91 into engagement with the contact 92. Engagement of switch arm 91 with contact 92 will energize the field coil 74 as follows: transformer secondary 119, wire 120, switch arm 91, contact 92, wire 156, limit switch 78, wire 157, field coil 74, wire 158 and wire 121 to transformer secondary 119. Energization of field coil 74 will cause rotation of the shaft 51 in a counterclockwise direction, this causing rotation of the cams 52 to 56 in this direction and causing the balancing arm 82 to be moved upwardly across the balancing resistance 83. This upward movement of the balancing arm 82 will decrease the portion of the balancing resistance 83 which is in parallel with the relay coil 89 and increase the portion of said resistance which is in parallel with the relay coil 90, this causing progressive decreasing of current flow in relay coil 89 and progressive increasing of the current flow in relay coil 90, this therefore acting to balance out the initial unbalancing action of the controller 105 on the relay 85. When the angular movement of shaft 51 is such that the movement of the balancing arm 82 causes complete re-balancing of the relay 85 the switch arm 91 will disengage contact 92, this causing stopping of the shaft 51 in this new position. It should therefore be apparent that an increase in temperature within the space 6 will cause the proportioning motor shaft 51 to be rotated in a counterclockwise direction, the degree of rotation being proportionate to the increase in temperature.

As the temperature within the space 6 increases the proportioning motor shaft 51 will be rotated counterclockwise as described above. This will cause the raised portion of the cam 55 to engage the follower portion of the switch 62 causing closing of this switch. Closure of switch 62 will cause operation of the compressor 23 due to energizing the compressor starter 32 by a circuit as follows: line wire 145, contact 99, switch arm 96, wire 146, wire 160, compressor starter 32, wire 161, switch 62, wire 162 and wire 149 to line wire 150. Upon further increase in temperature within the space 6 the shaft 51 will be rotated further in a clockwise direction and when said shaft approaches its extreme counter-clockwise limit of rotation, the raised portion of the cam 56 will engage the follower portion 64 of the switch 63 causing closing of this switch. Closing of the switch 63 will cause operation of the compressor 22 by energizing the compressor starter 31 as follows: line wire 145, contact 99, switch arm 96, wire 146, wire 163, compressor starter 31, wire 164, switch 63, wire 165 and wire 149 to line wire 150. It should be apparent, therefore, that as the temperature within the space 6 increases the number of compressors in operation is sequentially increased, the total number of compressors being placed in operation when the temperature reaches the upper limit of the operating range of controller 105.

If the temperature within the space 6 should now fall, the control arm 108 of the controller 105 will be moved across the control resistance 109 from right to left, this decreasing the portion of the control resistance 109 which is in parallel with the relay coil 89 and increasing the portion of said resistance which is in parallel with the relay coil 90. This will cause a greater current flow to occur in relay coil 90 than occurs in the relay coil 89, which results in the switch arm 91 engaging the contact 93. Engagement of the switch arm 91 with contact 93 will energize field coil 75 by a circuit as follows: transformer secondary 119, wire 120, switch arm 91, contact 93, wire 166, limit switch 80, wire 167, field coil 75, wire 158 and wire 121 to transformer secondary 119. Energization of field coil 75 will cause rotation of the shaft 51 in a clockwise direction and will cause the balancing arm 82 of the balancing potentiometer to move downwardly across the balancing resistance 83, this decreasing the portion of said resistance which is in parallel with relay coil 90 and increasing the portion of said resistance which is in parallel with relay coil 89. This will decrease the current flow in relay coil 90 and increase the current flow in relay coil 89 thereby tending to balance out the initial unbalancing effect of the controller 105 upon the relay 85. When the counterclockwise movement of shaft 51 is sufficient to cause the balancing potentiometer to completely balance out the unbalancing effect of the controller 105, the switch arm 91 will disengage from contact 93, this causing stopping of the shaft 51 in its new position.

The shaft 51 is therefore rotated in a clockwise direction upon falling temperature within the space 6. As the temperature within the space 6 falls the resulting clockwise rotation of shaft 51 will first cause opening of the switch 63, this placing the compressor 22 out of operation. Upon further fall in temperature the switch 62 will be open, this placing the compressor 23 out of operation and upon said further fall in temperature the switch 61 will be opened this placing compressor 24 out of operation. Upon a further fall in temperature the switch 60 will be opened, this resulting in the pump 18 being stopped. This will occur when the temperature within the space 6 falls to the lower limit of the operating range of the controller 105.

From the foregoing it should be apparent that so long as the relay 95 remains energized the controller 105 will be in control of the circulating pump and the compressors, such controller acting upon an increase in temperature to first place the circulating pump in operation and upon further increase in temperature to sequentially place the compressors in operation. It should also be apparent that under falling temperature the reverse action will take place, that is, the compressors will be sequentially placed out of operation and finally the circulating pump will be stopped.

If a power failure should occur the relay coil 95a will be deenergized due to lack of energizing current, this causing the switch arms 96, 97 and 98 to disengage the contacts 99, 100 and 101 and further causing the switch arm 97 to engage the contact 102. Disengagement of the switch arm 96 from contact 99 will break the energizing circuit for the motor starters 21, 31, 32 and 33. Therefore, the circulating pump and compressors will be prevented from operating when resumption of power even though the temperature within in the space may be such that the switches 60 to 63 are all closed. Disengagement of the switch arm 98 from contact 101 will break the holding circuit for the relay coil 96 previously described and therefore if the power should come on, the relay coil 95a will not be immediately energized. Engagement of the switch arm 97 with the contact 101 will cause a shunt circuit to be completed around the relay coil 89, this circuit being as follows: relay coil 89, wire 122, wire 133, wire 135, switch arm 97, contact 102, wire 127, wire 126, wire 124 and resistance 123 to the other side of relay coil 89.

Upon resumption of power, the relay coil 90 will become energized while the relay coil 89 will be substantially short-circuited as above described. Due to this unbalancing the switch arm 91 will engage the contact 93, this causing energization of the motor field 75 to rotate the shaft 51 in a counter-clockwise direction. Due to the complete shunting of the relay coil 89 the balancing potentiometer will be incapable of rebalancing the relay and therefore the switch arm 91 will remain engaged with the contact 93 and the shaft 51 will be driven to its extreme limit of clockwise rotation, at which time the raised portion 57 of the cam 52 will engage the switch 59 causing closing of this switch. Also at this time the cam 76 will engage the limit switch 80 causing opening of this switch and deenergizing of the field coil 75. With the shaft 51 in its extreme limit of clockwise rotation the recessed portions of the cams 53 to 56 will engage the switches 60 to 63 and hence all of these switches will be open. It should be seen, therefore, that engagement of the switch arm 97 with the contact 102 will upon resumption of power cause the proportioning motor shaft 51 to be rotated in its extreme clockwise limit of rotation at which position the pilot switches for the motor starters are all opened and the switch 59 is closed.

The closure of the switch 59 will cause energization of the relay coil 95a by a circuit as follows: transformer secondary 119, wire 140, relay coil 95a, wire 141, wire 168, switch 59, wire 169 and wire 143 to transformer secondary 119. Energization of the relay coil 95a will cause the switch arms 96, 97 and 98 to be brought into engagement with the contacts 99, 100 and 101. Engagement of the switch arm 98 with contact 101 will re-establish the holding circuit for the relay coil 95a which is as follows: transformer secondary 119, wire 143, wire 142, switch arm 98, contact 101, wire 141, relay coil 95a and wire 140 to transformer secondary 119. The relay coil 95a will therefore remain energized even though the switch 59 may later be opened. Engagement of switch arm 96 with the contact 99 will have no immediate result due to the fact that the switches 60, 61, 62 and 63 are all opened. However, due to engagement of switch arm 96 with contact 99 the switches 60 to 63 will be conditioned to cause starting of their respective motors when they are caused to close by counter-clockwise rotation of shaft 51. Due to the switch arm 97 disengaging the contact 102 the shunt circuit for the relay coil 89 will be broken and due to the switch arm 97 engaging the contact 100 the controller 108 will be replaced in control of the relay 85. As the balancing arm 82 of the balancing potentiometer will be engaging the extreme lower end of the balancing resistance 83 the relay coil 90 will be substantially shunted out while the entire balancing resistance 83 will be in parallel with the relay coil 89. The relay coil 89 will therefore be more highly energized than the relay coil 90, this causing engagement of the switch arm 91 with the contact 92 which results in energizing the field coil 74, this in turn causing rotation of the shaft 51 in a counter-clockwise direction, this counter-clockwise rotation causing sequential actuation of the switches 60 to 63, the number of switches actuated depending upon the degree of counter-clockwise rotation. When the counter-clockwise movement of the shaft 51 becomes such that the balancing potentiometer causes rebalancing of the relay 85 the switch arm 91 will disengage from contact 92, this stopping the shaft 51 in this position. As the required movement of the balancing potentiometer for balancing the relay 85 is dependent upon the position of the control arm 108 on the resistance 109, the movement of shaft 51 will be dependent upon the temperature within the space 6.

From the foregoing, it should be apparent that upon a failure of power, the control of the sequential controller 50 by the temperature controller 105 will be temporarily discontinued and the sequential controller 50 will be caused to rotate to a position in which all of the motors are disconnected from their source of power, at which time the sequential controller 50 is again placed under the control of the temperature controller 105, this causing it to reassume an angular position corresponding to the temperature in the space 6. In reassuming the angular position called for by the controller 105 the appropriate number of switches 60 to 63 are operated sequentially and hence the various motors are sequentially replaced in operation. Due to this sequential restarting of the motors heavy surges in current, such as would occur if all the motors were started simultaneously, are avoided.

It should be noted that due to the transformer 115 being connected to the load side of the line switch 10 the relay coil 96 will be deenergized whenever the line switch 10 is opened, this resulting in shutting down of the motors in operation due to disengagement of the switch arm 98 from contact 99, and results also in causing the controller 50 to be run to an "off" position before any of the motors can be restarted, the controller 50 acting also to sequentially restart the motors when the transformer 115 is again energized. Thus by opening the switch 10 the system may be placed out of operation and by merely closing the switch 10 the fan 7 will be placed into operation and the controller 50 will cause starting of the pump motor 20 and the number of compressor motors as called for by the controller 105.

In the illustrated embodiment of my invention, it will be observed that both the step-controller motor and the relay 95 receive their energizing current from a single transformer, this transformer being connected to the fan circuit. If desired, the step-controller motor may be energized by a separate source of power than that which supplies the fan motor and the other motors, thus permitting the step-controller to move to "off" position immediately after an interruption of power to the fan motor, instead of remaining in its original position until restoration of power, as occurs in the illustrated embodiment. With the arrangement just described, the switch arm 96 and contact 97 of the relay 95 could be eliminated.

While I have illustrated my invention as applied to a spray type of air conditioning system, it will be apparent that it is also applicable to direct expansion types of systems. The water pump may in such case be used for pumping condensing water, or if desired, it may be omitted. Furthermore, while I have illustrated the refrigeration system as comprising a plurality of compressors, it is to be understood that if desired, a single multi-speed compressor may be employed, the speed of such compressor being varied by the step-controller or equivalent arrangement. Also, it is to be understood that my invention is not limited to an air conditioning or refrigerating apparatus, but is applicable in its broader principles to control of other types of power consuming devices or control devices. It will be apparent that many changes which are within the scope of my invention will suggest themselves to those skilled in the art. I therefore desire to be limited only by the scope of the appended claims and the prior art.

I claim as my invention:

1. In an air conditioning system, in combination, an air conditioning chamber through which air is passed, means connecting said conditioning chamber with a space to be conditioned, cooling means in said conditioning chamber for cooling the air as it is passed through the chamber, means for supplying a cooling fluid to said cooling means including a power driven pump, means for chilling the cooling fluid comprising a compression refrigeration system including a plurality of independently driven compressors, a source of power for said pump and said compressors, sequential control means for sequentially placing said pump and said compressors in operation, condition responsive means for controlling said sequential control means, means responsive to a failure of power for placing said condition responsive means out of operation and for causing said sequential control means to be operated to disconnect said source of power from said pump and said compressors, and means actuated when said sequential controller disconnects said pump and said compressors for replacing said condition responsive means in control of said sequential control means.

2. In an air conditioning system, in combination, an air conditioning chamber through which air is passed, means connecting said conditioning chamber with a space to be conditioned, cooling means in said conditioning chamber for cooling the air as it passes through the chamber, means for supplying a cooling fluid to said cooling means, means for causing chilling of the cooling fluid comprising a plurality of independently driven compressors, a source of power therefor, sequential control means for sequentially placing said compressors in operation, condition responsive means for controlling said sequential control means, means responsive to a failure of power for placing said condition responsive means out of operation and for causing said sequential control means to be operated to a position in which said source of power is disconnected from said compressors, and means actuated when said sequential controller reaches the position mentioned for replacing said condition responsive means in control of said sequential control means.

3. In a system of the class described, in combination, a plurality of power consuming devices, control means for sequentially placing said power consuming devices in operation, and means operable upon a failure of power for causing a sequential replacing of said power consuming devices in operation upon resumption of power.

4. In a system of the class described, in combination, a plurality of power consuming devices, a plurality of control devices therefor, motor means for sequentially actuating said control devices, load responsive means for controlling said motor means, and means responsive to the power supply for temporarily dominating the control of said load responsive means over said motor means upon the occurrence of a predetermined condition in said power supply.

5. In a system of the class described, in combination, a plurality of power consuming devices, a plurality of control devices therefor, motor means for sequentially actuating said control devices, load responsive means for controlling said motor means in a manner to cause the power consuming devices to be sequentially placed in operation upon increase in load, and means operable upon a failure of power for causing said motor means to sequentially replace said power consuming devices in operation.

6. In a system of the class described, in combination, a plurality of power consuming devices, a plurality of control devices therefor, motor means for sequentially actuating said control devices, load responsive means for controlling said motor means in a manner to cause the power consuming devices to be sequentially placed in operation upon increase in load, and means operable upon a failure of power for operating said motor means independently of said load responsive means to a position in which the power consuming devices are out of operation, and for then restoring the control of said motor means to said load responsive means.

7. In a system of the class described, a plurality of control devices, motor means for sequentially actuating said control devices, condition responsive means controlling said motor means for causing sequential actuation of said control devices in a predetermined program in accordance with the condition to which it is responsive, and means responsive to the medium controlled by said control devices also controlling said motor means.

8. In a system of the class described, a plurality of control devices, step control means for sequentially actuating said control devices, condition responsive means for controlling said step control means, and means responsive to the medium controlled by said control devices for causing recycling of said step control means upon the occurrence of a predetermined condition of such medium.

9. In a system of the class described, in combination, a plurality of control devices, means for sequentially actuating said control devices, motor means for positioning said actuating means, control means for said motor means, and means operable upon the occurrence of a predetermined condition for operating said motor means independently of the control means to move said actuating means to a predetermined position, and for then restoring the control of said motor means to said control means.

10. In a system of the class described, in combination, a controller, motor means for actuating said controller, control means for said motor means, and means operable upon the occurrence of a predetermined condition for operating said motor means independently of said control means to a predetermined position and for then restoring the control of said motor means to said control means.

11. In a system of the class described, in combination, power consuming means, a controller for said power consuming means, motor means for actuating said controller, load responsive means for controlling said motor means, and means operable upon a failure of power for causing operation of said motor means independently of said load responsive means in a direction to position said controller for preventing supply of power to said consuming means, and means for then restoring the control of said motor means to said load responsive means.

12. In a system of the class described, in combination, power consuming means, control means for progressively controlling said power consuming means, and means operable upon a failure and subsequent resumption of power for progressively replacing said power consuming means in operation.

13. In a system of the class described, in combination, a progressive control device, motor means for actuating said progressive control device, control means for said motor means, means for placing said control means out of operation and for causing said motor means to move said progressive control device towards a predetermined position, and control means automatically actuated upon the progressive control device reaching the predetermined position, for replacing said control means in control of said motor means.

14. In a system of the class described, in combination, a plurality of control devices, movable means for sequentially actuating said control devices, motor means for driving said movable means, control means for controlling said motor means, means for placing said control means out of operation and for causing said motor means to drive said movable means towards a predetermined position, and means automatically actuated upon the movable means reaching said predetermined position for replacing said control means in control of said motor means.

15. In a system of the class described, in combination, a progressive control device, motor means for actuating said progressive control device, control means for said motor means, means responsive to the condition of the medium controlled by said progressive control device for placing said control means out of operation upon said condition varying to a predetermined value, said condition responsive means also causing said motor means to move said progressive control device towards a predetermined position, and control means automatically actuated upon the progressive control device reaching the predetermined position, for replacing said control means in control of said motor means.

16. In a system of the class described, in combination, a plurality of control devices, movable means for sequentially actuating said control devices, motor means for driving said movable means, control means for controlling said motor means, means responsive to the condition of the medium controlled by at least one of said control devices for placing said control means out of operation upon such condition varying to a predetermined value, said condition responsive means also causing said motor means to drive said movable means toward a predetermined position, and means automatically actuated upon the movable means reaching said predetermined position for replacing said control means in control of said motor means.

17. In a system of the class described, in combination, a power consuming means, progressive control means for said power consuming means, motor means for actuating said progressive control means, load responsive means for controlling said motor means to position said progressive control means in accordance with load conditions, and means operable upon failure of power for placing said load responsive means out of operation and for operating said motor means to run said progressive means towards "off" position, and means actuated upon said progressive control means reaching a predetermined position for replacing said load responsive means in control of said motor means.

18. In a system of the class described, in combination, a plurality of power consuming devices, sequential control means for sequentially placing said power consuming devices in operation, motor means for actuating said sequential control means, load responsive means for controlling said motor means to cause actuation of said sequential control means upon change in load, means operable upon failure of power for placing said load responsive means out of operation and for energizing said motor means to drive said sequential control means towards "off" position, and means actuated upon said sequential control means reaching a predetermined position for replacing said load responsive means in control of said motor means.

FRANCIS B. FILLO.

DISCLAIMER 2,157,329.—*Francis B. Fillo*, Webster Groves, Mo. CONTROL SYSTEM. Patent dated May 9, 1939. Disclaimer filed April 26, 1940, by the assignee, *Minneapolis-Honeywell Regulator Company*.

Hereby disclaims the subject matter of each of claims 3, 4, 5, 6, 7, 8, 9, 10, 11, 12, 13, 14, 15, 16, 17, and 18 of said Letters Patent.

[*Official Gazette May 21, 1940.*]